Patented Feb. 18, 1930

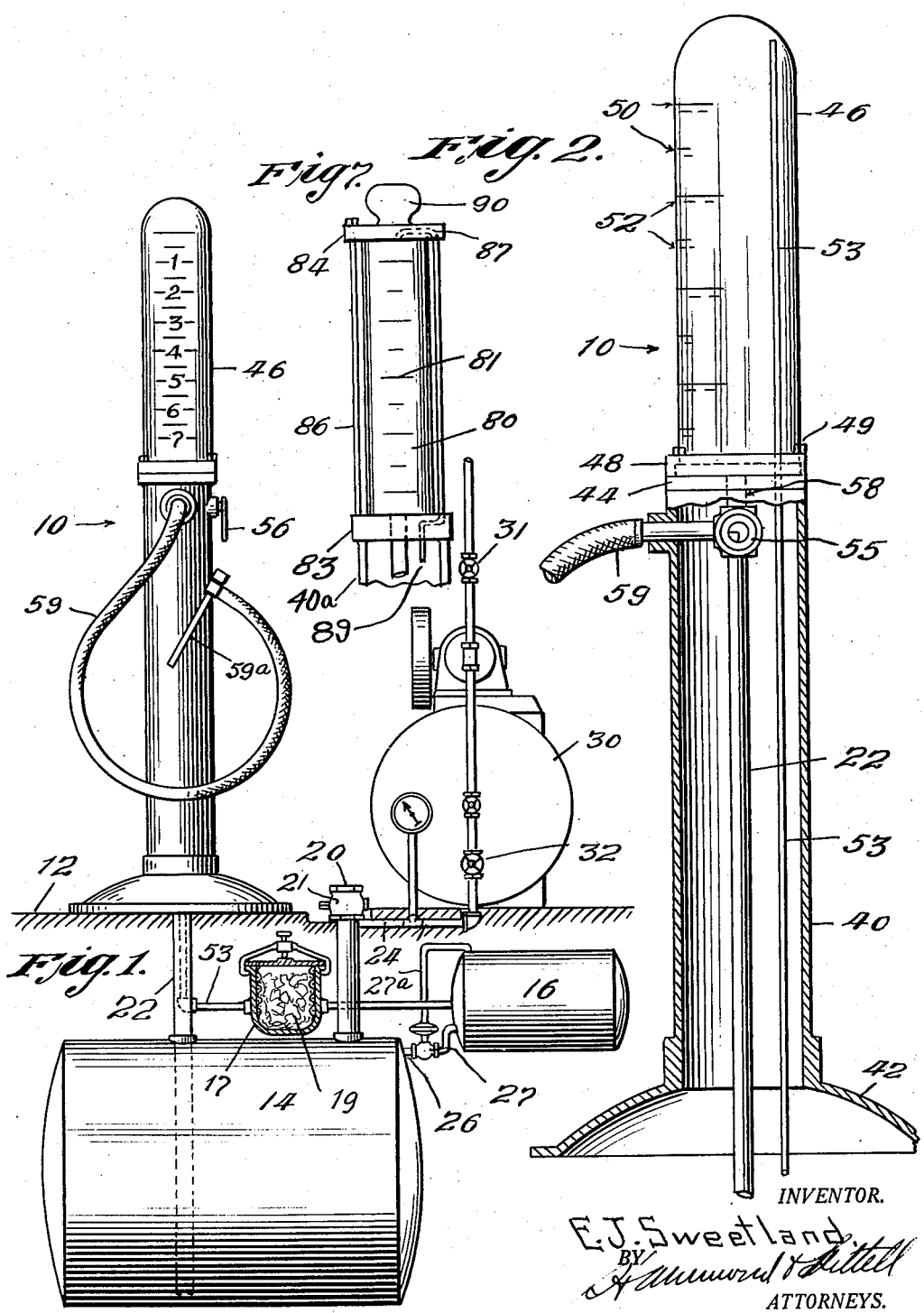

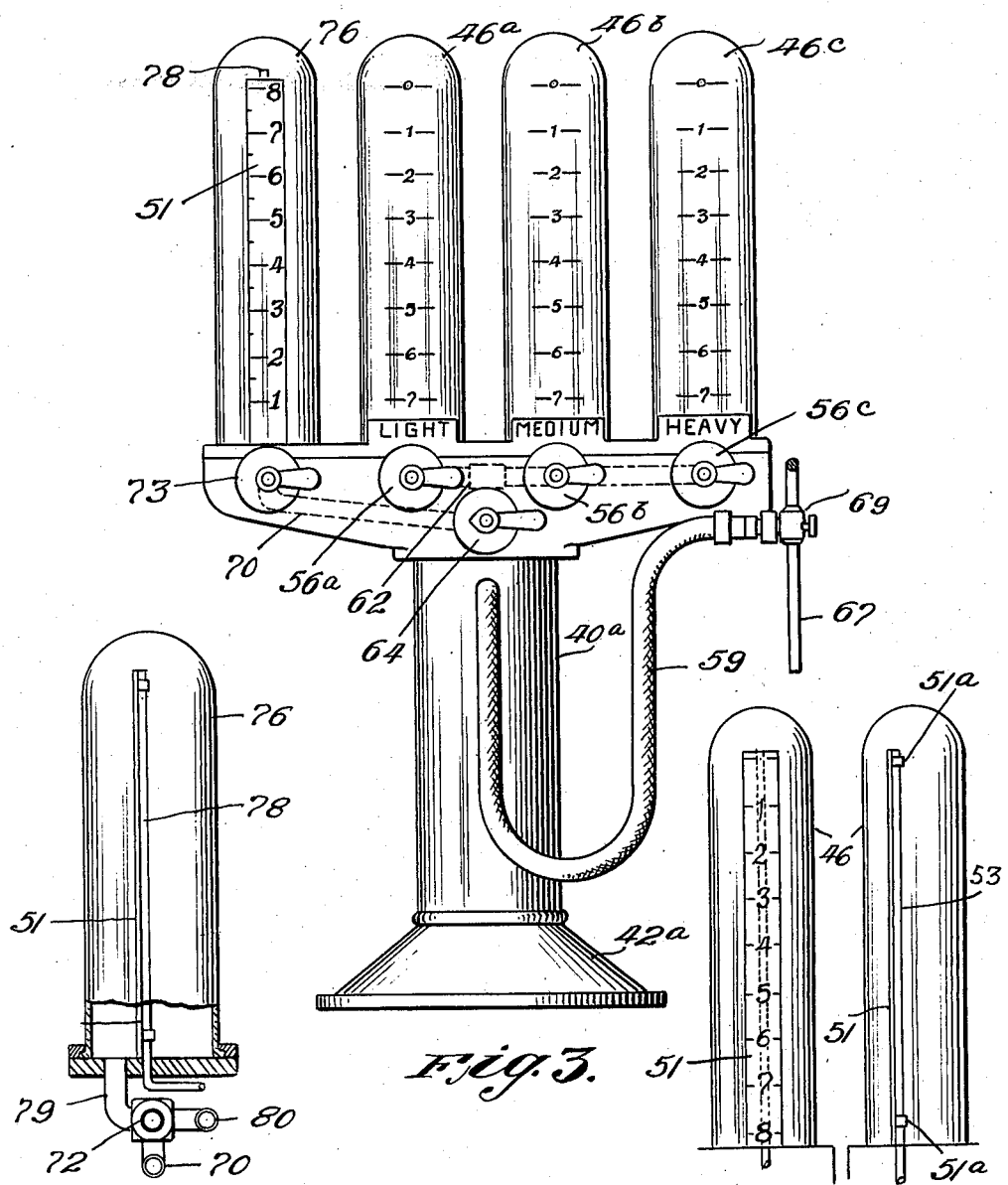

1,747,608

UNITED STATES PATENT OFFICE

ERNEST J. SWEETLAND, OF HAZLETON, PENNSYLVANIA

LUBRICATING-OIL-DISPENSING APPARATUS

Application filed January 7, 1925. Serial No. 960.

This invention relates particularly to apparatus for dispensing lubricating oil used in the engines of automotive vehicles, although its principles may be usefully employed in the dispensing of other commodities.

Among the objects of the invention are:

To provide means for visibly displaying the character and quality of the oil being dispensed.

To dispense such oil in a clean, rapid, efficient and economic manner.

To provide readily operated means for selectively distributing a particular grade of oil from avaliable supplies of different grades of oil upon display.

To provide associated indicating means for facilitating the dispensing of a measured quantity of the lubricating oil.

To provide an indicating scale or numerical graduation which will compensate for the variation in the oil delivery due to its adherence to the glass receptacle containing the same.

To provide means for supplying to the visible dispensing receptacles as frequently as emptied, a new supply of lubricating oil from a storage source.

To provide means whereby the lubricating oil in the visible dispensing chambers as well as the main storage receptacles may be maintained under desired pressure in order to effect rapid discharge of the oil therefrom either to the engine-crank case, when being filled, or to the visible storage chamber when being replenished from the main storage supply.

To provide means whereby liquid may be dispensed or transferred without reference to difference in relative levels of the parts, to maintain constant pressures for such transference and dispensation and to maintain constant pressure ratios for such conveyances.

To provide means for the removal of moisture and dirt from air entering the system and to thereby maintain the oil unpolluted and the indicating and inspection devices unclouded.

To provide means for rapidly removing the dirty oil from the automobile crank case and temporarily storing said oil in a visible container preparatory to recharging the crank case with new oil from a similar visible container.

To provide means for isolating a relatively thin film of the liquid being drained or dispensed and for so presenting this isolated film that the liquid condition, quality and quantity may be judged.

These, as well as other objects, will be manifested from a reading of the following specification.

The method in vogue at the present time for draining and replenishing crank cases of automobiles is laborious, uncleanly and time consuming, since it involves the use of a hand measure which is filled from the can or barrel and necessitates the carriage of the filled measure from the barrel to the engine, with the incident liability of drippage of the oil upon the floor, user's clothing or on the finished surface of the vehicle itself. The conveyance of oil in open vessels also causes a lessening of its value as a lubricant, since dust and dirt often fall into such vessels, accumulating until swept into suspension and thence into the automobile bearings.

Furthermore, considerable wastage takes place at the point of crank case filling due to the fact that the filling orifice is small while the mouth of the measure is large.

The advantages, therefore, of the dispensing system such as is herein illustrated and described wherein the lubricating oil is conducted directly from the storage receptacle to the crank case of the engine, into which it is directly discharged, will be manifest.

In the accompanying drawings, I have illustrated the various embodiments and principles of my invention, same being illustrative rather than definitive, as I may resort to changes or modifications of the apparatus without departing from the spirit of the employed principles.

Fig. 1 illustrates in elevation one system embodying the principles of my invention.

Fig. 2 is an elevation in partial cross-section of a dispensing unit employed in the system.

Fig. 3 is an elevation of a multiple unit.

Fig. 4 shows diagrammatically a part of the device shown in Fig. 3.

Figs. 5 and 6 illustrate certain details.

Fig. 7 serves to show a modified form of measuring bell.

In Fig. 1, the dispensing unit or units 10 are shown as mounted upon the floor or roadway 12. Oil supply tank 14 is shown as beneath this floor near air receiver 16 and separating device 17. It will be understood, however, that the relative elevation of the parts is immaterial so far as operation is concerned.

The oil supply tank 14 may be of any desired capacity and may be a single tank or a plurality of tanks. It is preferably provided with a filling nozzle 20 having a pressure retaining valve 21, an oil flow pipe 22, an air inlet pipe 24 and an air outlet pipe 26. Air pipe 24 communicates with a suitable air compressor unit 30 which may be identical with that used for tire inflation and the like purposes about the garage, a pipe line leading to such stations being commonly provided. Compressed air entering through pipe 24 maintains a constant pressure upon the oil in tank 14. This pressure is preferably fixed sufficiently high to force the oil against the head due to difference in level between tank 14 and dispenser unit 10, plus a sufficient pressure to produce free and rapid flow through pipe 22 against the low pressure from receiver 16. This high pressure may be the same as that maintained by unit 30, or may be adjusted relatively thereto by a suitable valve 32.

The pipe 26 opens into tank 14 above the oil level therein and serves to carry a portion of the compressed air into air receiver 16, a suitable diaphragm valve 27, actuated through pressure pipe 27ª, serving to maintain a fixed lower pressure in receiver 16 for oil discharge purposes, as will be described.

Receiver 16 may be any suitable form of air tank, while separator 17 is preferably provided with a suitable removable basket holding chloride of lime or other moisture-absorbing or filtering material 19. Thus means is provided to absorb all moisture from, and to thoroughly cleanse, the air passing to the measuring bells, preventing chance contamination of the oil therein or clouding of the measuring bell glass.

Dispenser unit 10 comprises a standard 40 provided with a suitable pedestal 42 and having a flanged top 44 supporting the inverted glass measuring chamber or bell 46 which is secured in place by such means as a ring flange 48 secured by bolts 49 and clamping bell 46 to flanged top 44, through the medium of a suitable resilient joint packing, after the manner well known to the art. Bell 46 is preferably transparent, and serves as an oil display and inspection chamber as well as for measuring purposes. For performance of the measuring function, bell 46 may be equipped with suitable graduations or indicators 50 affixed directly to the bell itself or to a framework adjacent thereto.

The position of indicators 50 may be fixed in design of the bell and manufactured as a part of the bell manufacture or may be affixed as the result of suitable tests. In either case, a secondary series of indicators 52 providing correction for drainage of the oil from the walls of chamber 46 is preferably also provided.

While the indicators may be affixed directly to, or upon, the bell 46, I prefer that a separate scale 51 with clips 51ª engaging the air pipe 53, be provided, as shown in Figs. 5 and 6. This permits use of a scale laid out upon a plane surface which may be enameled or glazed, provided with easily legible insignia and treated with luminous material. Such a surface may be made light-reflecting, and since the layer of oil between it and the wall of the dispensing bell is relatively thin, the customer is able to clearly see the color and nature of the oil being supplied and to readily detect suspended dirt, if such there is, at the same time pipe 53 being concealed and the appearance of a whole device improved. Manifestly, in certain instances, other illuminants than the luminous material aforementioned may be installed upon the scale or bell, or in suitable relationship thereto to aid illumination.

The mounting of scale 51 is such as to permit vertical adjustment for correction of the indicator reading, and, if desired, the supplementary correction indicators 52 may be dispensed with, although their use is in no way impeded if they are applied.

Air pipe 53 opens into bell 46 near its top and provides an open duct from this bell to the receiver 16. Bell 46 is therefore always under a pressure slightly greater than atmospheric, preferably a pressure of two or three pounds per square inch, as fixed by valve 27. Flow pipe 22 extends upward through standard 40 to control valves or to cock 55, which is preferably of the three-way type and equipped with a manipulating handle 56 protruding from the exterior of the standard 40 at convenient height. Valve 55 also connects with a pipe 58 leading to bell 46 and with a discharge pipe 59 preferably of metallic hose or other flexible tubing so that it may be connected directly with the automobile filling opening or tube, engagement with which is made easy by nozzle 59ª. Thus, by manipulation of handle 56, bell 46 may be placed in communication with oil tank 14 or with discharge pipe 59, connection with each of these being cut off when the other is connected.

The operation of this embodiment of my system is entirely controlled by handle 56. When handle 56 points upward toward the measuring bell, the bell is in communication with flow pipe 22 and tank 14, and the air pressure in tank 14 forces oil upward into bell 46 until it has been filled to the desired indicator 50. Handle 56 is then turned downward again and oil flow ceases. Since the pressure in tank 14 and pipe 53 is always open, venting for bell 46 is accomplished through this pipe 53 without other vent. Corrections for indicators 50 are unnecessary when filling the bell, for the oil film follows the oil surface in its travel over the measuring chamber wall; hence the film is included in the bulk of the oil in the chamber when the oil surface is rising.

When it is desired to dispense a quantity of oil, hose 59 is attached to the point of oil delivery and handle 56 turned to point toward the hose. Oil then flows from bell 46 under air pressure supplied through pipe 53. The oil level in bell 46 may be watched and when the desired quantity of oil has been delivered, handle 56 is again turned downward stopping oil flow.

It is during the act of dispensing that correction indicators 52 are so important. As has been previously stated, the oil film on the walls of chamber 46 follows the surface of the oil. This means that a considerable quantity of oil will adhere to the chamber walls, particularly if a heavy or viscous liquid is being dispensed. This liquid will gradually drain downward into the bulk of liquid in chamber 46, but such drainage requires a considerable period of time and it would be impractical to wait for complete drainage before disconnecting hose 59. This drainage I have, however, reduced to a constant factor, since the discharge opening is of known area and discharge occurs under a constant pressure supplied from pipe 53. Thus, by test or computation, a series of correction indicators 52 may be fixed in place, and when the oil level is brought to these in dispensing a given quantity of oil, the drainage and film error will be compensated for and will not affect the correctness of the volume discharged through hose 59.

A plurality of dispenser units may be operated from a single tank or tanks 14 and may be located at any desired points either below, above, near to, or remote from, the oil supply. If desired, tanks 14 may be located outside of the building line, or through suitable piping filling connections 20 which may be so located that oil may be received to the system from tank wagons or cars without entrance to, or obstruction of, the user's premises and at a reduced cost of delivery.

In many instances a single grade of lubricating oil is suitable for but one type of automobile, or perhaps for but one part of the mechanism of a given automobile. Hence it becomes desirable that a single dispensing unit be able to provide several grades of lubricant and that the user be able to inspect the lubricant before purchase and to enable him to easily select the desired grade. It is also very desirable that the residue and dirty oil already in the mechanism be completely removed before new oil is introduced and that this removed oil be measured and inspected for contamination and diluents. To conveniently care for all of the above desirable functions, I have provided the multiple unit shown in Fig. 3.

Standard 40$^a$ is supported by a base 42$^a$ similar to the base and standard previously described. Standard 40$^a$ supports an elongated top member 60 mounting the measuring bells 46$^a$, 46$^b$, and 46$^c$, each of which is provided with a control valve actuated by handles 56$^a$, 56$^b$, and 56$^c$. These bells are similar in most respects to bell 46, previously described, in that each is provided with an air supply pipe, measuring indicators, an oil inlet pipe, and the like. Their discharge pipes are, however, united in a common discharge pipe 62 leading to one opening of three-way valve 64, which also connects with discharge hose 59 terminating in a suitable elongated nozzle 67 having a shut-off valve 69. Valve 64 has also an opening to a pipe 70, leading to four-way valve 72 manipulated by handle 73 and connecting with bell 76. Bell 76 is provided with a suitable measuring indicator 51, with an internal pipe 78 leading to a suitable source of minus pressure or vacuum, and with a discharge connection 79 leading through valve 72 to pipe 80 connecting with an oil tank, or other place of discharge for contaminated oil. Manifestly, pipe 78 may also be connected, by suitable ducts and valves, with a source of compressed air, so that oil drawn into bell 76 may be forcibly ejected to the point of oil disposal or through hose 59 back to the mechanism from which it was removed, in such cases as oil inspection only, proves necessary. It will be noted that the drained oil is simultaneously measured and presented for inspection while in bell 76.

The operation of this multiple unit is as simple and convenient as of the single unit. Each bell 46$^a$, 46$^b$, and 46$^c$, connects with its particular supply tank, and manipulation of valves 56$^a$, 56$^b$, and 56$^c$, will fill each with its particular grade of oil as desired. It has been found convenient to use three grades of oil, namely "light", "medium", and "heavy", and to so mark the measuring bells, but manifestly other bells may be added to care for other grades, or oils may be blended in a given bell if desired.

Bell 76 is normally emptied immediately after use, and to drain oil, nozzle 67 is simply thrust into a convenient opening in the automotive mechanism oil container and to the bottom thereof. Handle 73 is turned to connect bell 76 with pipe 70, valve 64 is set to connect pipe 70 with hose 59, and valve 69 is opened. The oil in the mechanism will be rapidly drained to bell 76 and will be displayed therein in such manner as to be readily inspected for contamination. Flow will continue, subject to manipulation of valve 69, until the mechanism is completely drained to bell 76, where its volume may be read. It is a noteworthy feature of my invention that the oil enters bell 76 at a rapid rate; hence the rush of air following the last of the oil effectually drains and purges hose 59 and nozzle 67 of dirt and residue.

The mechanism once thoroughly drained, valve 64 may be turned to connect with the bell 46 containing that grade of oil desired for use in the mechanism. Manipulation of a valve 56 will then dispense the required quantity of oil, through hose 59, which was cleaned and dried after the manner described. If desired, a quantity of oil from each bell 46, or from any two bells, may be dispensed simultaneously, or in sequence, to produce a blended oil at the point of dispensation.

The drained oil in bell 76 is conveniently disposed of, by operation of handle 73, through pipes 79 and 80, or after the manner previously described.

The construction of the measuring bell may be modified as shown in Fig. 7, in which a glass tubular body member 82, provided with suitable indicators 81, is clamped between end flanges 83 and 84 by tension of tie-rods 86, suitable packing being preferably interposed. Tie-rods 86 may be made hollow to provide the necessary upward extensions of air pipes 53 or 78. These hollow tie-rods communicate at their upper ends with suitable channels 87, opening to the interior of body member 80, and at their lower ends with ducts 89, in base flange 83, and connecting with the system piping. The weight of flange 84 may be borne by rods 86 and this flange serves as a suitable support for an advertising globe or illuminant support 90 which may receive electric current through wires carried downward thru certain of the hollow rods 86, not employed for other purposes.

The various pipe connections are most conveniently installed within the standard 40ª, but have been omitted from this figure to simplify description, since the manner of installation and connection will be clear to those skilled in the art in view of the previous disclosures herein.

It will be clear that since flow through discharge hose 59 always takes place under pressure, ordinary differences in level will have no effect, and the hose may be directed where desired without reference to elevation. It will also be manifest that delivery and drainage under pressure will greatly expedite operation and reduce the time factor substantially, while it will be noted that the oil is at all times protected from dirt or foreign materials and displayed in an attractive manner for easy inspection and comparison.

As heretofore explained, both the main storage tank 14 as well as the dispensing chamber 46 are maintained under constant air pressure so that the fluid will be caused to rapidly flow under operating conditions. The liquid in storage receptacle 14 would in ordinary practice be maintained under pressure of 25 pounds per square inch, while the liquid in the display and dispensing bell 46 would be under a considerable lower pressure approximately 3 pounds per square inch. The air supply reservoir supplies this lower pressure as has heretofore been explained.

The air pressure on the liquid in tank 14, as well as the pressure of air in the storage tank 16, are automatically maintained at their respective degrees, and it is obvious that an automatic regulator may be connected with the motor to start the pump if the pressure drops below the desired degree.

The dispensing bells 46, 46ª, 46ᵇ, and 46ᶜ are suitably proportioned so as to make a balanced and attractive outfit. The glass domes are preferably from four to six inches in diameter and the scale may be made in such a way as to stand out prominently on a background provided by the color of the oil and, in order to make a marked difference, so as to emphasize the scale and make it readily readable at a distance, I propose to use white enamelware, porcelain or some similar material, and in cases where light oil of transparent character is used, this scale so constructed will emphasize the color and nature of the oil the customer is purchasing. I may also use a reflecting surface on the scale, such as polished metal or mirror, or the scale may be treated as heretofore mentioned with a luminous material suitably protected from action by the oil.

It will be observed that I have provided an extremely rapid method of draining and refilling crank cases by means of an apparatus which is attractive in appearance and one embodying the desirable feature of displaying portions of the oil to be dispensed so that the prospective customer has ample opportunity to see and judge of the character of the oil that he is being furnished, and a further opportunity, according to one phase of my invention, to observe the contaminated condition of the used oil which has been withdrawn from the crank case preparatory to its replenishment.

The invention is largely based upon the idea of providing a measuring receptacle having a gaseous pressure on the upper portion thereof for rapidly forcing the dispensed liquid from the receptacle and obviously other means than those illustrated may be employed for forcing the liquid into the measuring receptacle. For instance the tank 14 instead of being placed under ground may be placed at a higher level than the dispensing apparatus so that the oil will flow into it by gravity. Or the tank 14 may be located in any convenient place and be provided with a connection and a force pump, which pump may be started when desired to force liquid into the measuring receptacle and stopped when a desired level has been reached.

Under normal conditions it would be most convenient to use air as the gaseous medium for providing pressure in the upper portion of the measuring receptacle as a means of rapidly forcing out the liquid to be measured, but any other gas may be employed without departing from the spirit of the invention. For example, if the liquid being handled were subject to rapid oxidation then some inert gas which would have no chemical effect upon the liquid would be employed.

In cases where desired and especially when the device is to be set outside during very cold weather I may place an incandescent lamp within the oil measuring chamber as a means of warming the oil and thus minimizing the amount which adheres to the walls of the measuring chamber, and at the same time providing light to facilitate inspection of the oil and reading of the scale.

Obviously the principles of my invention herein described have wide application and their employment in other ways and to other uses are within the spirit of the invention. It is further to be understood that the dispensing unit or parts of the described system may be employed independently of other parts where circumstances may make it desirable, without departing from the spirit or scope of the invention.

Furthermore the method of correction for liquid film and drainage is also of broad application and usefulness and may be applied to equal advantage in connection with the dispensing of other liquids. Structural changes may also be indulged in without departing from the scope of the invention as defined by the appended claims.

I claim:

1. In a liquid dispensing device a volumetric measuring chamber provided with graduations, and a secondary set of graduations, said secondary set being of different heights from said first set and designed to allow for the film of liquid adhering to the walls of said chamber.

2. In a liquid dispensing device a volumetric measuring chamber provided with graduations, and a secondary set of graduations designed to allow for the film of liquid adhering to the walls of said chamber, said second set of graduations being of different corresponding heights to said first set, means of rapidly forcing the liquid from said chamber.

3. In a liquid displaying, dispensing and measuring device, comprising a graduated chamber having a discharge orifice in one of the walls of said chamber, means of maintaining a substantially constant pressure of a gas in the upper portion of said chamber for rapidly forcing the liquid from said discharge orifice, said means comprising a pressure tank, a secondary tank and a constant pressure control valve therefor.

4. In a liquid displaying, dispensing and measuring device comprising a measuring chamber and discharge orifice in one of the walls of said chamber and means of preserving a substantially constant pressure of a gas in the upper portion of said chamber above the fluid level, a valve for controlling the flow of liquid out of said orifice and means of refilling said measuring chamber by forcing a fluid into it at a pressure greater than the pressure of gas maintained in the upper portion of said measuring chamber, said means for preserving a substantially constant pressure including a pressure tank, a secondary tank and a constant pressure control valve therebetween.

5. In a method of dispensing a liquid under a constant pressure which consists of maintaining said liquid in a tank, introducing said liquid into a graduated receiver, maintaining a dependent gaseous pressure lower than the pressure in said first tank, then dispensing said fluid under said lower dependent gaseous pressure from said receiver when it is desired to dispense same.

6. In a volumetric liquid measuring device, a measuring chamber, liquid inlet and discharge ducts for said chamber, a liquid level indicator upon a transparent wall of said chamber, and indicator reading correction means associated with said indicator and correcting readings of level drop for chamber wall drainage when flow occurs through said discharge duct, and means for varying said indicator reading correction means relative to the liquid level indicator.

7. A liquid commodity dispensing system comprising a liquid storage tank, a measuring chamber, suitable conduits connecting said tank and chamber, a gas compressor maintaining a pressure upon said tank to force liquid to said chamber, a pressure reducing device supplying said measuring chamber with gas at a lower pressure than that maintained on said storage tank, and a control valve controlling the aforesaid conduits and thereby the operation of the system.

8. A liquid commodity dispensing system, comprising measuring devices, a liquid storage tank, an air receiver, an air compressor discharging to said storage tank, an air pressure controller connecting said storage tank, with said receiver and supplying air to the receiver, a liquid duct connecting said storage tank and said measuring devices, an air conduit connecting said receiver and said devices, means for interrupting flow in said duct, and means for discharging liquid from said devices when said flow is interrupted and under the pressure supplied through said conduit.

9. A liquid dispensing system, comprising a graduated measuring cylinder, a liquid supply tank, an air receiver, means maintaining superatmospheric pressure in said supply tank and a lower pressure in said receiver, a conduit connecting said supply tank with said cylinder, a duct connecting said receiver with said cylinder, a discharge for said cylinder, and mechanism controlling said conduit and discharge.

10. In a liquid display system, dispensing and measuring apparatus which comprises a graduated cylinder, an air receiver, an air duct communicating with the upper portion of said cylinder and leading to said air receiver wherein the pressure is normally higher than atmospheric pressure, and means to dry the air which is admitted to said graduated cylinder through said duct.

11. In a liquid displaying, dispensing, and measuring device which comprises a graduated receptacle and valve controlled opening through which a liquid under pressure may be admitted to said receptacle, a gas drying means, means of rapidly forcing the dispensed liquid from said receptacle by a gaseous pressure maintained in the upper portion thereof, said gas passing through said drying means to obviate an emulsion and clouding the receptacle.

12. A liquid display, dispensing and measuring device comprising a graduated receptacle provided with a valved opening for the entrance and exit of a liquid into and from said receptacle, means of maintaining a gaseous pressure in the upper portion of said receptacle including a liquid supply tank, a gas pressure tank and a constant pressure reducing valve therebetween, and flexible dispensing tube associated with the exit of said receptacle and a valve located adjacent to the end of said flexible tube which is farthest from said receptacle.

13. In a liquid measuring and display device of the class described, a transparent commodity chamber, a liquid supply tank, a gas tank, means to maintain each tank under pressure, the gas tank being automatically maintained at a constant lower pressure than the liquid supply tank, a conduit connecting the liquid supply tank and the commodity chamber, a conduit connecting the gas tank and the top of the commodity chamber, valve means to enable the liquid to rise into the commodity chamber against the gas pressure and to permit the liquid to be forced out under said gas-pressure, said commodity chamber being provided with a scale to indicate the static volume and the true volume of the liquid therein.

14. In a liquid commodity display and dispensing apparatus, a plurality of measuring and display chambers, liquid supply tanks, a gas tank, a pressure reducing device between them to maintain the pressure in the liquid supply tanks higher than the pressure in the gas tank, conduits connecting the liquid tanks with respective chambers, other conduits connecting the tops of the chambers with the gas tank, valve means to permit the filling of the chambers against the gas pressure, other valve means to permit discharge of the liquid under pressure, said gas conduit being incorporated in the support for the measuring chamber and said chamber being provided with a double scale for determining the actual volume and the apparent volume of the liquid therein, the apparent volume scale being adjustable.

15. A commodity display device for measuring and dispensing liquids comprising a graduated receiver, a second receiver adapted to contain the liquid to be dispensed, a duct leading from the upper portion of the graduated receiver to a gas supply reservoir, a conduit connecting the lower portion of the second receiver with the graduated receiver, and means for forcing air under pressure into said second receiver to force the liquid into said graduated receiver and compress the gas in said gas supply reservoir and permit said gas to dispense the liquid from said graduated receiver.

16. A device for measuring and dispensing fluids which comprises a graduated receiver, said receiver having a transparent wall through which the liquid level in said graduated receiver may be observed, a valved conduit to admit a liquid to said graduated receiver from a supply tank and valved conduit for dispensing the liquid from the graduated receiver, a second receiver containing a gaseous fluid under pressure communicating with the upper portion of the graduated receiver in such manner that a portion of the gaseous fluid will discharge from the second receiver into the graduated receiver to displace liquid dispensed from the graduated receiver.

In testimony whereof I have affixed my signature to this specification.

ERNEST J. SWEETLAND.